(12) United States Patent
Niederer (10) Patent No.: US 10,241,665 B2
(45) Date of Patent: Mar. 26, 2019

(54) CONTROLLING GRAPHICAL ELEMENTS OF A DISPLAY

(71) Applicant: True Wealth AG, Zürich (CH)

(72) Inventor: Felix Niederer, Zurich (CH)

(73) Assignee: TRUE WEALTH AG, Zürich (CH)

( * ) Notice: Subject to any disclaimer, the term of this patent is extended or adjusted under 35 U.S.C. 154(b) by 423 days.

(21) Appl. No.: 14/918,095

(22) Filed: Oct. 20, 2015

(65) Prior Publication Data

US 2017/0109028 A1    Apr. 20, 2017

(51) Int. Cl.
| | | |
|---|---|---|
| *G06F 3/0482* | (2013.01) | |
| *G06F 3/0484* | (2013.01) | |
| *G06T 11/20* | (2006.01) | |

(52) U.S. Cl.
CPC ........ *G06F 3/04847* (2013.01); *G06F 3/0482* (2013.01); *G06T 11/206* (2013.01); *G06T 2200/24* (2013.01)

(58) Field of Classification Search
CPC .. G06F 3/04847; G06F 3/0482; G06T 11/206; G06T 2200/24
See application file for complete search history.

(56) References Cited

U.S. PATENT DOCUMENTS

| | | |
|---|---|---|
| 4,751,640 A | 6/1988 | Lucas et al. |
| 7,461,027 B1 | 12/2008 | Volpert |
| 8,131,576 B2 | 3/2012 | Rothberg et al. |
| 8,335,734 B1 | 12/2012 | Sauter |
| 8,352,382 B1 | 1/2013 | Katta et al. |
| 8,429,051 B1 * | 4/2013 | Samson ................. G06Q 40/06 235/379 |

(Continued)

FOREIGN PATENT DOCUMENTS

| | | |
|---|---|---|
| EP | 0686926 A2 | 12/1995 |
| WO | WO 2009/036276 A1 | 3/2009 |

(Continued)

OTHER PUBLICATIONS

"Constant Sum—Qualtrics Support", posted on Jun. 4, 2015 to https://www.qualtrics.com/support/survey-platform/survey-module/editing-questions/question-types-guide/specialty-questions/constant-sum/, retrieved Jan. 23, 2018.*

*Primary Examiner* — Shourjo Dasgupta
(74) *Attorney, Agent, or Firm* — Birch, Stewart, Kolasch & Birch, LLP (57) ABSTRACT

The method according to the invention deals with controlling of graphical elements of a display having a plurality of pixels with one or more processors, the method including defining by said one or more processors a graphical main shape on the display representing a total volume of a root node, defining by said one or more processors within the graphical main shape a number of graphical node shapes on the display, the number of node shapes being at least one and each node shape representing a volume of a parent node, wherein the volumes of all parent nodes sum up to the total volume, controlling by said one or more processors the pixels of the graphical main shape to visually present the graphical main shape on the display, redefining the graphical node shapes in response to receiving an input signal from an input device indicating a selection of a parent node, indicating a manipulating of a volume of a selected node shape or indicating an opening of a particular parent node.

13 Claims, 3 Drawing Sheets

(56) References Cited

U.S. PATENT DOCUMENTS

| | | | |
|---|---|---|---|
| 9,400,976 B1* | 7/2016 | Courtright | G06Q 20/405 |
| 9,830,659 B2* | 11/2017 | Santner | G06Q 40/06 |
| 2002/0097277 A1* | 7/2002 | Pitroda | G06F 3/0483 |
| | | | 715/854 |
| 2002/0128947 A1 | 9/2002 | Sauter et al. | |
| 2002/0188544 A1 | 12/2002 | Wizon et al. | |
| 2002/0198812 A1 | 12/2002 | Wizon et al. | |
| 2003/0093348 A1 | 5/2003 | Finn | |
| 2003/0167221 A1 | 9/2003 | Kochansky | |
| 2003/0187777 A1 | 10/2003 | Kochansky et al. | |
| 2003/0200171 A1 | 10/2003 | Kochansky | |
| 2004/0073579 A1 | 4/2004 | Snyder | |
| 2004/0153435 A1 | 8/2004 | Gudbjartsson et al. | |
| 2004/0181477 A1 | 9/2004 | Sauter et al. | |
| 2004/0210501 A1 | 10/2004 | Laskin et al. | |
| 2005/0055300 A1 | 3/2005 | Kochansky | |
| 2005/0086155 A1 | 4/2005 | Villacorta et al. | |
| 2005/0234934 A1 | 10/2005 | Mackay et al. | |
| 2005/0273422 A1 | 12/2005 | Villacorta et al. | |
| 2006/0031077 A1 | 2/2006 | Dalton et al. | |
| 2006/0287937 A1 | 12/2006 | Flinn et al. | |
| 2007/0083455 A1 | 4/2007 | Bove et al. | |
| 2009/0063366 A1 | 3/2009 | Friedman et al. | |
| 2009/0083194 A1 | 3/2009 | Booraem et al. | |
| 2009/0138307 A1 | 5/2009 | Belcsak et al. | |
| 2009/0164581 A1 | 6/2009 | Bove et al. | |
| 2009/0254490 A1 | 10/2009 | Wallman | |
| 2009/0271241 A1 | 10/2009 | Pratt | |
| 2010/0094326 A1 | 4/2010 | Robbins | |
| 2010/0153870 A1* | 6/2010 | Hoffmann | G06Q 10/06 |
| | | | 715/767 |
| 2010/0169237 A1* | 7/2010 | Howard | G06Q 40/06 |
| | | | 705/36 R |
| 2010/0174664 A1 | 7/2010 | Kelly et al. | |
| 2010/0223619 A1* | 9/2010 | Jaquet | G06F 9/5016 |
| | | | 718/104 |
| 2010/0256995 A1 | 10/2010 | Oliver | |
| 2010/0317278 A1 | 12/2010 | Novick | |
| 2011/0099123 A1 | 4/2011 | Nichols et al. | |
| 2011/0166983 A1 | 7/2011 | Tucker et al. | |
| 2012/0116993 A1 | 5/2012 | Ouimet et al. | |
| 2012/0284079 A1 | 11/2012 | Vakhutinsky et al. | |
| 2012/0330796 A1 | 12/2012 | O'Hara et al. | |
| 2013/0080978 A1 | 5/2013 | Kakde et al. | |
| 2013/0125200 A1 | 5/2013 | Sharma | |
| 2014/0067714 A1* | 3/2014 | Melton | G06Q 40/06 |
| | | | 705/36 R |
| 2014/0244380 A1* | 8/2014 | Willeitner | G06Q 30/0249 |
| | | | 705/14.45 |
| 2015/0019569 A1* | 1/2015 | Parker | G06F 17/30572 |
| | | | 707/748 |
| 2015/0081685 A1* | 3/2015 | Ashenfelter | G06F 17/30961 |
| | | | 707/723 |
| 2016/0027113 A1* | 1/2016 | Sodhi | G06Q 40/04 |
| | | | 705/37 |
| 2016/0117773 A1* | 4/2016 | Lin | G06Q 40/06 |
| | | | 705/36 R |
| 2016/0253759 A1* | 9/2016 | Decanini | G06Q 40/06 |
| | | | 705/36 R |

FOREIGN PATENT DOCUMENTS

| | | |
|---|---|---|
| WO | WO 2009/039395 A1 | 3/2009 |
| WO | WO 2011/000099 A1 | 1/2011 |

\* cited by examiner

CONTROLLING GRAPHICAL ELEMENTS OF A DISPLAY

TECHNICAL FIELD

The invention relates to a method of controlling graphical elements of a display having a plurality of pixels with one or more processors, including defining by said one or more processors a graphical main shape on the display representing a total volume of a root node, defining by said one or more processors within the graphical main shape a number of graphical node shapes on the display, the number of node shapes being at least one and each node shape representing a volume of a parent node, wherein the volumes of all parent nodes sum up to the total volume, controlling by said one or more processors the pixels of the graphical main shape to visually present the graphical main shape on the display and controlling by said one or more processors the pixels of the graphical node shapes to visually present the graphical node shapes on the display.

BACKGROUND ART

The document US 2011/166983 A1 discloses investment funds enabling a bond laddering strategy. An open-ended fund, such as an ETF, holds fixed-income securities and has a liquidation date. An order management system receives buy orders from a plurality of investors for purchasing shares of the fund receives and sell orders from a plurality of investors for selling shares of the fund. A fund management information system determines a yield for each investor based on the shares of the fund purchased by the investor and the fixed-income securities held by the fund at the time that the shares were purchased.

Document US 2005/086155 A1 discloses a system and method for enabling a portfolio manager to obtain credit approval for an issuer of securities from a credit analyst. The system includes a relational database containing subjective and objective issuer information, a graphical user interface for permitting a portfolio manager to submit a credit approval request to a credit analyst, a graphical user interface for permitting a credit analyst to evaluate the credit approval request submitted by the portfolio manager based on the issuer information contained in the database, and a graphical user interface for permitting the credit analyst to resolve the credit approval request on behalf of the portfolio manager.

SUMMARY OF THE INVENTION

It is an object of the invention to create a method of controlling graphical elements of a display pertaining to the technical field initially mentioned, that enables a fast, easy and easily understandable manipulation of the volume of a parent node and adapting the volume of at least one other parent node without affecting the total volume of all parent nodes.

It is another object of the invention to create a method of controlling graphical elements of a display pertaining to the technical field initially mentioned, that enables a fast, easy and easily understandable way to visually present on the display parent nodes having one or more child nodes each of them having a particular volume.

It is yet another object of the invention to create a system for performing these methods.

The solution of the first object of the invention is specified by the features of claim 1. According to the invention, the method further includes the following steps:

receiving by said one or more processors an input signal from an input device indicating a selection of a parent node, and in response to said receiving determining by said one or more processors a possible range for the volume of the selected parent node by determining a minimum value and a maximum value of the range, defining by said one or more processors a graphical dialog shape on the display representing the possible range for the volume of the selected parent node, defining by said one or more processors a graphical shifter shape within the graphical dialog shape representing a current value of the volume of the selected parent node, controlling by said one or more processors the pixels of the graphical dialog shape to visualize the graphical dialog shape on the display and controlling by said one or more processors the pixels of the graphical shifter shape to visualize the graphical shifter shape on the display, receiving by said one or more processors a second input signal from an input device indicating manipulating of the graphical shifter shape with the input device, the manipulating defining a target volume of the selected parent node and in response to said manipulating determining by said one or more processors a target volume for each parent node, wherein the target volumes of all parent nodes sum up to the total volume, redefining by said one or more processors the graphical node shapes to represent the target volumes of the parent nodes and controlling by said one or more processors the pixels of the graphical node shapes to visualize the redefined graphical node shapes on the display.

Said one or more processors typically are part of a computer system including one or more computers. The computer system may be located at a particular location or may also be distributed over several locations that are linked to each other.

Whereas the steps of the method are carried out by said processors, the selection of the parent node and the manipulating of the graphical shifter shape are usually executed by a user of the computer system. The display as well as the input device is arranged near the user such that the user may not only execute these steps but also see the result of his interactions on the display. The computer may be arranged locally with the input device and the display being connected directly to the computer. The computer may however also be arranged remotely from the user in which case the input device and the display are connected to the computer indirectly, for example via a computer network. The connections may be established using any kind of media to transmit data such as for example wires, optical fibers, radio or wireless communication or any other suitable media. And the network may be of any type of architecture such as Peer-to-Peer or Client-Server architectures. Further, the network may be of any kind such as for example a Local Area Network (LAN), a Personal Area Network (PAN), a Metropolitan Area Network (MAN), a Wide Area Network (WAN), a Global Area Network (GAN) or any other type of network.

The display may be any kind of display or screen suitable to present visual information, usually according to an electrical input signal which may be either analog or digital. Such displays may be active by emitting light or passive by modulating available light during the process of reflection or transmission. The display may be integrated into the housing of a computer or it may be a separate device that is connected to a computer by means of a cable or even wirelessly. The display may be a monochrome or a color display. The display is preferably a dot-matrix display having a number of pixels arranged in a 2-dimensional array. The number of pixel or the display resolution may range from one, two or three hundred pixels per side up to several thousands of pixels per side of the matrix, depending also on the size of the display. The pixels of such a display may be controlled individually such that arbitrary shapes can be formed and displayed.

It does not matter on which technology the display is based. It may for example be a projector of any kind, a CRT (cathode ray tube) monitor, a LCD (liquid crystal display), a PDP (plasma display panel), a LED (light emitting diode) display or any other kind of display suited to be connected to a computer and controlled by a processing unit.

Controlling the pixels of the display can be performed differently, depending on the technology of the display and depending on what shall be the result on the display, i.e. what the visual effect shall be for the user. Controlling of a pixel is for example done by turning a pixel on and off, by setting or modulating the brightness or luminance of a pixel, by changing the color of a pixel according to a control signal. The control signal typically is generated by the processor that controls the display. Depending on the technology of the display, the control signal to control a pixel of the display has to be generated with different properties as known by those skilled in the art.

The processors may be any kind of processing unit, designated also as processor that can be used to control a display such as a microprocessor, a video controller, a graphics processor or any other kind of microcontroller. Also the display may be controlled by dedicated video or graphics cards being part of a computer or that may be connected to a computer.

In a preferred embodiment of the invention, the method is implemented as a web application, where the computer of a user is connected to the computer of a service provider through the internet and where the display is the display of the user's computer. The user's computer may carry out some steps of the invention and also the computer of the service provider may carry out some other steps of the method. In most cases, the web application is delivered to the user over a network connection and through a browser interface to the user. Depending on the particular implementation of the method according to the invention, the method steps may be suitably distributed onto the involved processors.

The input device may be any device suitable to input any kind of data into a computer to select a particular node and to define a target volume of it. Such input devices for example include a computer mouse, a keyboard, a trackpad, a touchscreen, a gesture recognition system to recognize gestures of the user or any other known input device.

The term volume is to be understood in a broad way. It may for example designate just a certain quantity, expressed for example simply as a positive number where the number is preferably a positive integer. But the volume may also designate a certain quantity or amount of a particular material, object or entity such as for example a certain quantity of air, a certain number of apples or a certain amount of money.

Further it is to note that different kinds of input devices may be connected to the computer and may be used to select a node. And similarly, different kinds of input devices may be used to define a target volume of a selected node.

In this way, the user may easily select one of a plurality of given parent nodes where the display is controlled to reflect the selection by visually presenting the graphical dialog shape with the possible range in which the volume of the selected parent node may be varied. Further it is very easy for the user to input a target volume of the selected parent node by manipulating the graphical dialog shape, namely by manipulating the graphical shifter shape with one of the input devices provided by the computer.

In another example selection of a parent node or manipulating the graphical shifter shape to define a target volume of the parent node or both of these steps are carried out by a computer too. In such an example, a computer for example determines a particular parent node to be amended according to some rules or based on some conditions and/or defines a target volume of the selected parent node.

In another preferred embodiment of the invention, at least one of the parent nodes includes at least one child node having a volume, wherein the volume of all child nodes of the parent node sum up to the volume of the parent node. Or in other words, one or more or even all of the parent nodes has one or more child nodes. In each case however, the volumes of all child nodes of a particular parent node sum up to the volume of that particular parent node. In this case, the method further includes the step of receiving by said one or more processors a third input signal from an input device indicating an opening of a particular parent node, i.e. indicating that a particular parent node is chosen to be opened. The step of indicating a parent node to be opened is usually executed by a user using any of the input devices available. In response to said receiving, the graphical node shapes are redefined by said one or more processors such that a number of the graphical node shapes corresponds to a number of the child nodes of the opened parent node. Accordingly, each of the graphical node shapes represents a volume of a child node of the opened parent node. Further, the pixels of the graphical node shapes are controlled by said one or more processors to visually present the redefined graphical node shapes on the display.

Prior to the opening of a particular parent node, the graphical main shape and the graphical node shapes are used to visually present the parent nodes and after the opening of a particular parent node the graphical main shape and the graphical node shapes are used to visually present the child nodes of the opened node element. To do so, the graphical node shapes are redefined in their number to reflect the number of child nodes of the opened parent node which is usually different from the number of parent nodes. And the sizes of the graphical node shapes are redefined to reflect the volumes of the child nodes of the opened parent node which also are usually different from the volumes of the parent nodes. After redefining the graphical node shapes, the pixels of the display are controlled to visually present the redefined graphical node shapes to show the number and volumes of the child nodes of the opened parent node on the display.

The different graphical shapes may be defined to have any possible shape. However, some shapes are better suited to represent the parent nodes as parts of the root node where the volumes of the parent nodes sum up to the total volume of the root node or to represent a graphical element which facilitates the indication of a target volume. Preferably, a single closed area on the display is defined to represent the total volume of the root node. And this single, closed area is divided into a number of sub-areas where each sub-area represents one of the parent nodes and where all sub-areas completely fill the single, closed area of the root node. In this way, the relation of the volumes of the parent nodes and the total volume can be graphically illustrated in a simple way. Examples for such a single, closed area of the display are: any type of regular or irregular polygon such as triangles, rectangles, pentagons, hexagons and so forth or any area enclosed by one or more closed, at least partially curved lines that do neither intersect themselves nor each other such as an ellipse or a circle. Most preferably, the graphical main shape is defined as a ring-like area of the display, particularly an annulus-like area of the display. Accordingly, the graphical node shapes are defined as sectors of the ring-like area where all graphical nodes shape together completely fill the ring-like area.

The graphical dialog shape however represents a range which typically is a one dimensional range defining a minimal and a maximal value for the possible target value of a parent node. Therefore, shapes are preferred to represent a one-dimensional range. The graphical dialog shape could for example be defined as a clock face or a sector of it where the graphical shifter shape is defined as a rotatable pointer shape to indicate the target value. The graphical dialog shape could also be defined to be a part of the selected node shape or a part of the transition zone between two node shapes. For instance in the case of graphical node shapes defined as sectors of a ring-like main shape the graphical dialog shape could at least partially coincide with the ring-like area and the handle shape could at least partially coincide with the graphical boundary between two adjacent sector-like node shapes. Or in other words, the borderline between two adjacent node shapes may serve as the handle shape. When manipulating the handle shape in this case, the method could for example be adapted to just change the ratio of the volumes of the two nodes represented by the two adjacent node shapes while keeping the volumes of the other nodes fixed. The method could however also be adapted to rescale the volumes of the other nodes by any suitable function. In case the volume of a node represented by one of the adjacent node shapes is blocked (see further below what blocked means), manipulating the handle shape could mean to just change the ratio of the unblocked node while keeping the volumes of the other nodes fixed or it could mean that the volumes of the other nodes is resealed as well by any suitable function.

Preferably however, the graphical dialog shape is defined by said one or more processors to include a bar-like shape and the graphical shifter shape is defined by said one or more processors to include a handle shape that is arranged on the bar-like shape to represent the current volume of the selected parent node.

In this case, the manipulating of the graphical shifter shape with an input device preferably includes arranging the handle shape at a position on the bar-like shape representing the target volume of the selected parent shape. It would however also be possible to move the bar-like shape such that the handle shape remains fixed on the display and the bar-like shape is arranged such that the handle shape indicates the desired target value.

In order to allow the user to indicate a vanishing target volume for the selected parent node, step of defining by said one or more processors the graphical dialog shape includes defining a graphical null shape representing a possible zero value for the volume of the selected parent node. Preferably, the graphical null shape is a small graphical shape that is arranged at the bar-like shape to represent a zero value on the bar-like shape.

It is another object of the invention to create a method of controlling graphical elements of a display pertaining to the technical field initially mentioned, that enables a fast, easy and easily understandable way to visually present on the display parent nodes having one or more child nodes each of them having a particular volume.

The solution of the second object of the invention is specified by the features of claim 8. According to the invention, the method further includes the following steps:

receiving by said one or more processors a fourth input signal from an input device indicating an opening of a particular parent node, and in response to said receiving redefining by said one or more processors the graphical node shapes such that a number of the graphical node shapes corresponds to a number of child nodes of the opened parent node, and controlling by said one or more processors the pixels of the graphical node shape to visually present the redefined graphical node shapes on the display.

In this way, the user may easily open one of a plurality of given parent nodes having one or more child nodes where the display is controlled to reflect the opening of the parent node by redefining the graphical node shapes such that their number corresponds to the number of child nodes of the parent node and such that the sizes of the graphical node shapes represent the volumes of the child nodes and by visually presenting the redefined graphical node shapes on the display. Or in other words, when a particular parent node is opened, the basic layout on the display with the graphical main element remains unchanged and only the partitioning of the graphical main element is changed to newly reflect the child nodes of the opened parent node instead of the entirety of the parent nodes.

The selection or the opening of a particular parent node is very easy for the user and can be accomplished in many different ways depending inter alia on the available input devices. Selection of a parent node is preferably done by clicking the respective node shape and opening of a parent node is preferably done by double-clicking the respective node shape. Clicking and double-clicking can for example be done with the key of a mouse or by tapping respectively double tapping on a touchpad or on a touch screen.

Selecting or opening of a parent node may however be accomplished by other input action such as for example choosing a parent node with the arrow keys of a keyboard and pressing a specific key on the keyboard to select or open it.

The process of opening a particular parent node presented on the display and then to visually present its child nodes in a similar way is designated in this description as drill down. Such a drill down is however not only possible for the parent nodes that do have at least one child node but also for every child node that itself has a child node. A child node of a child node is hereinafter designated as a grandchild node. In such a case the child nodes assume the role of the parent nodes and the grandchild nodes adopt the role of the child nodes within the method described above. Of course a drill down is also possible for any grandchild node that has at least one child node, designated hereinafter as a great-grandchild node. In such a case the grandchild nodes assume the role of the parent nodes and the great-grandchild nodes of a grandchild node adopt the role of the child nodes within the method described above.

Such a drill down is generally possible for every node that has at least one sub-node, independent of its hierarchical level. The method may for example include two, three, four or even more hierarchical levels. Depending on the particular application the method may for example include up to 10 or 20 levels. Preferably, the method however includes about two to five levels and most preferably, the method includes two or three levels. This means that there exist two or three levels of nodes below the root node such that a number of at most two drill downs are necessary to advance down to the third level of grandchild nodes. A single level usually is not sufficient to reproduce the complexity of a given application and more than three levels may result in a structure that is too complicated.

In case of a preferred three level structure, at least one of the child nodes includes at least one grandchild node having a volume, wherein the volumes of all grandchild nodes of a child node sum up to the volume of said child node. The method then further includes receiving by said one or more processors a fifth input signal from an input device indicating an opening of a particular child node. In response to said receiving of the fifth input signal the graphical node shapes are redefined such that a number of the graphical node shapes corresponds to a number of grandchild nodes of the opened child node and such that each graphical node shape representing the volume of a grandchild node. Further, the pixels of the graphical node shapes are controlled by said one or more processors to visually present the redefined graphical node shapes on the display.

In a preferred embodiment of the invention, the total volume corresponds to an amount to be invested. Accordingly, the volume of a parent node corresponds to an amount to be invested into a particular investment product or to a sum of the amounts to be invested within a category of investment products. A parent node may either represent a particular product in which a part of the total volume is to be invested or it may represent a category of investments including a collection of usually similar products within that category. A particular investment product may for example be a mutual or an investment fund such as an ETF (exchange trade funds).

A category of investments may however not only include products but also include sub-categories which again may include products or sub-sub-categories of investments.

A category of investments just including products may for example be the category real estate shares. Each product is formed by the real estate shares of a particular country or a certain group of countries. An example for a category including products and sub-categories is the category commodities. This category includes for example product diverse commodities and further a sub-category precious metals. The sub-category precious metals in turn may include the products gold and silver. Other examples of categories may include no particular product but only sub-categories of investments.

In this embodiment, using the method according to the invention, the user may easily gain an overview of his investment and amend it as desired. The investments which are usually divided into a plurality of categories and products, are visually presented on the display of a computer in a structured and intuitively understandable way where the volume of each product or category of products can be easily amended as desired by one or more drill downs to the desired product and changing its volume as described above.

The entirety of the root node, the parent nodes, the child nodes, the grandchild nodes et cetera are designated as nodes for the purpose throughout this description. The term product in contrast thereto is used for the entirety of all nodes which do not include any sub-node. I.e. grandchild nodes having no great-grandchild nodes, child nodes having no grandchild nodes and parent nodes having no child nodes are therefore designated as products.

In a preferred embodiment of the invention a product-specific unit size is related to each product. Each unit size preferably is a given volume greater than zero that is specific for a particular product. There is however one particular product, designated as the absorber product, that has a unit size of zero. The relevance of the unit size is that the volume of a product may not assume any arbitrary value but only an integer multiple of its unit size. The volume of a product may therefore be either zero or a positive integer multiple of its unit size. Since the unit size of the absorber product is zero, the absorber product may assume any arbitrary value.

In order to determine the possible range for a particular parent node in response to its selection and to determine the target volumes for the other parent nodes in response to the definition of the target volume of the selected parent node, the volumes of all nodes are preferably expressed as relative volumes, preferably in relation to the sum of the volumes of all nodes within the same branch of nodes. A branch thereby denotes the collection of all direct sub nodes of a particular node. All parent nodes are direct child nodes of the root node and therefore form such a branch. Other branches are for example all child nodes of a particular parent node or all grandchild nodes of a particular child node. Accordingly, the sum of the relative volumes of all nodes of a branch equals 1. It is to note that the relative volumes of the nodes are usually expressed and visually presented as percentage quotations such that the relative volumes of all nodes of a branch sum up to 100%.

The volumes can however also be expressed as absolute volumes which for example means in relation to the total volume. In this case, the absolute volume of a particular node is expressed as the product of the relative volumes of all nodes along a path between the root node and that particular node. The absolute volume of a child node therefore is calculated by multiplying the relative volume of the root node, being 1, with the relative volume of that child node's parent node and the relative volume of the child node itself.

The values for the relative volumes and the absolute volumes can be easily converted into each other.

In case the number of hierarchical levels is two or more, the target volumes for all nodes are determined in response to the manipulating of the graphical shifter shape to define a target volume of a selected node. In order to determine the target volume for the nodes the method includes assigning a relative ideal volume to each node, determining an absolute ideal volume for each product by multiplying all relative ideal volumes of all nodes along a path between the root node and the respective product, setting the absolute volume of each product to its absolute ideal volume, and unless the unit size of the product is zero, flooring the absolute volume of the product to the next lower integer multiple of its unit size, determining a remaining volume by subtracting the absolute volume of each product from the total volume, except for the absorber product, ordering the products in descending order of the difference of their absolute ideal volume and the floored absolute volume, distributing the remaining volume to the products by, in said order, adding one unit size to each product thereby skipping any product having a unit size exceeding either the then remaining volume or the absolute ideal volume of the absorber product, and adding the remaining volume to the absorber product.

It is to note that the volume determined for a particular node (be it expressed as an absolute or a relative volume) usually slightly differs from the target volume of that node. The target volume represents the user's desire whereas the absolute or relative volume denotes what is feasible considering the unit sizes of the products. Since what is feasible shall be presented on the screen the method preferably is adapted to redefine the graphical node shapes such that their sizes reflect the relative volumes of the nodes and then the pixels of the display are controlled to visually present the redefined graphical node shapes to show these redefined graphical node shapes on the display.

The child nodes and the grandchild nodes of the selected parent node are designated hereinafter as a subtree of the selected parent node.

Then the possible range for the volume of a particular node of a branch B is preferably determined in that the possible range for all nodes of the branch B is determined. For every node N of branch B this is done by determining a minimal relative ideal volume as the minimum value of the range and a maximal relative ideal volume as the maximum value of the range, both being relative values, as follows:

determining for each product of the subtree of the node N a ratio of its unit size to a result of a multiplication of the relative ideal volumes of all nodes on a path between the parent node and the product excluding the node N itself, determining the minimal relative ideal volume of the node N as a maximum of said ratios, and determining the maximal relative ideal volume of the node N as 1 minus the sum of the minimal relative ideal volumes of all remaining nodes of the branch B.

This method allows setting a consistent lower boundary for the possible range of the ideal relative volume of any given node, thereby just adapting the ideal relative volumes of the nodes of the same branch but keeping the ideal relative volumes of all other nodes fixed.

In another preferred embodiment of the invention, it is possible to lock the ideal volume of one or more of the nodes such that they remain unchanged when the volume of another selected node is changed. In this case the method preferably further includes the following steps:

defining by said one or more processors a graphical lock shape on the display, controlling by said one or more processors the pixels of the graphical lock shape to visually present the graphical lock shape on the display, receiving by said one or more processors a fifth input signal from an input device indicating a locking of the selected node, and in response to said receiving redefining by said one or more processors the graphical node shape of the selected node to represent a locked selected node, controlling by said one or more processors the pixels of the graphical node shape of the locked selected node to visually present the graphical node shape of the locked selected node on the display, and omitting determining the target volume for each locked node but keeping the current volume of the locked node.

In yet another preferred embodiment, the method includes steps that allow to define fallback volumes for each node. This helps to enlarge the possible range for the target volume of a selected node. To do so, the method further includes assigning a relative fallback volume to each node, replacing the relative ideal volume by the relative fallback volume for a node and for all child nodes of that node and for all grandchild nodes of that node.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols. Generally, it is to note that all presentations shown in the figures may include further graphical shapes that are not shown in these figures such as for example graphical shapes that may be used for navigation, for example moving up a hierarchy level or a graphical shape that may be used to permanently save an adapted configuration of the volumes.

PREFERRED EMBODIMENTS

Figure 1:
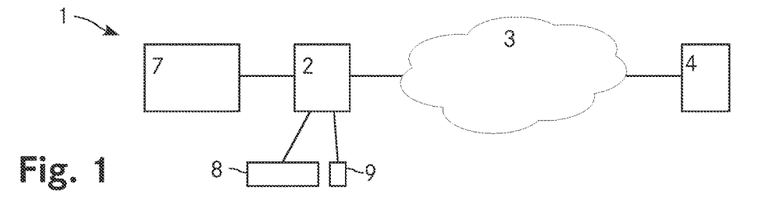
FIG. 1 a schematic depiction of a computer system for carrying out the method according to the invention.

FIG. 1 shows a schematic depiction of one example of a computer system 1 suitable for carrying out the method according to the invention. The computer system 1 includes a user computer 2 that is connected through the internet 3 to a service computer 4 such as for example a computer of a service provider providing services in the field of financial management. A display in the form of a computer screen 7, a keyboard 8 and a computer mouse 9 is connected to the user computer 2 either wired as shown or wirelessly.

Figure 2:
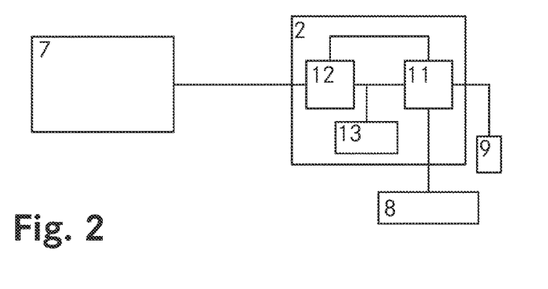
FIG. 2 a schematic depiction of a computer of FIG. 1.

FIG. 2 shows a more detailed schematic depiction of the user computer 2 of the computer system shown in FIG. 1.

The user computer 2 controls the screen 7 by controlling the pixels of the screen 7 individually. To do so, the user computer 2 includes a processor such as for example a graphics chip 12 on a graphic board integrated into the user computer 2. The user computer 2 further includes a CPU (central processing unit) 11 to execute a program that is for example stored on an internal storage 13 of the user computer 2. The internal storage may be a volatile memory such as for example a RAM (random access memory), a non-volatile storage such as for example a hard disk or a solid state disk or it may be a combination of both or even further types of computer memories.

The service computer 4 in this case provides the information which graphical elements shall be controlled by the CPU 11 and the graphic chip 12 to be visually presented on the screen 7, for example whether the main shape or the node shapes shall be controlled to be visually presented on the screen 7 or not and which number of node shapes shall be visually presented and what shape and size they shall have.

The user can interact with the user computer 2 by pressing keys on the keyboard 8 or by using the computer mouse 9 to arrange a cursor as desired and using the mouse keys to click, double-click or drag and drop any graphical shapes presented on the screen 7.

Figure 3:
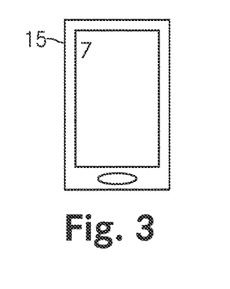
FIG. 3 a schematic depiction of another computer for carrying out the method according to the invention.

FIG. 3 shows a schematic depiction of another computer for carrying out the method according to the invention or at least a part of it. FIG. 3 shows a mobile phone 15 having a screen 7 which in this case is a touch screen. The user may use a finger as the input device or he may use other input devices suitable to be used on such a display such as for example a digital pen or the like.

Figure 4:
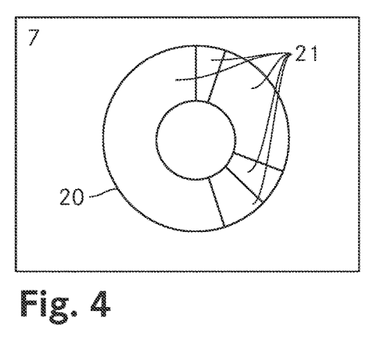
FIG. 4 a first example of a visual presentation of a graphical main shape including node shapes on the display of a computer.

FIG. 4 shows a first example of a visual presentation of a graphical main shape 20 including a number of node shapes 21 on a screen 7. The main shape 20 has an annulus shape and each node shape 21 has the shape of a sector of the annulus of the main shape 20. As can be seen, the node shapes 21 are sized and arranged such as to completely fill the main shape 20 without overlapping each other. In this way, the screen area occupied by the node shapes 21 sums up to the screen area occupied by the main shape.

The area of the screen occupied by the main shape 20 represents for example a certain quantity of objects or of a material. It could for example represent a certain total amount of land. In this case, the node shapes 21 each represents a portion of the land such that all land portions sum up to the total amount of land. The area of the screen occupied by each node shape 21 is chosen such that the ratio of two given node shapes 21 equals the ratio of the respective portions of the land which the nodes shapes 21 represent.

FIG. 5 shows some further possible visual presentations of a graphical main shape 20 including a number of node shapes 21. They all have in common that the node shapes 21 completely fill the main shape independent of the shape of the main shape 20 and the shapes of the node shapes 21.

Figure 5A:
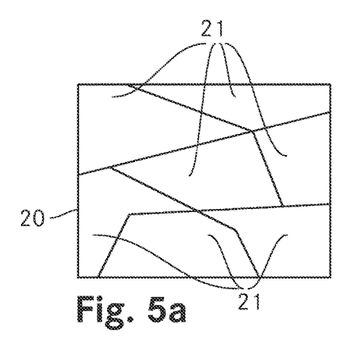
FIGS. 5a-5d a second to fifth visual presentation of a graphical main shape including node shapes.
Figure 5B:
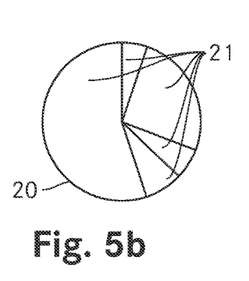
Figure 5C:
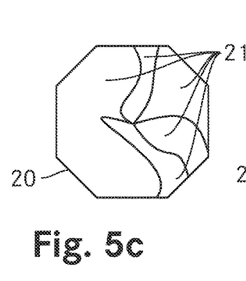
Figure 5D:
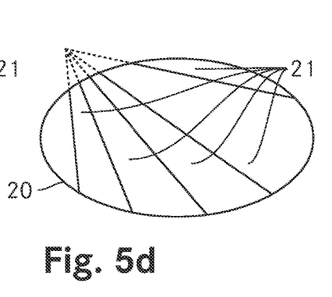

FIG. 5a shows a rectangular main shape 20 where the area of the main shape 20 is subdivided by straight lines into sub-portions where each sub-portion forms a node shape 21. The main shape 20 in FIG. 5b has a circular shape that is divided into sectors that form the node shapes 21. FIG. 5c shows a pentagon shaped main shape 20 where lines starting at a central point of the pentagon and ending on the edge of the pentagon divide the main shape 20 into the node shapes 21. And FIG. 5d shows an elliptical main shape 21 divided into the node shapes 21 by lines starting at an arbitrary point outside of the main shape as shown by the dotted extension of the lines outside the ellipse.

Figure 6:
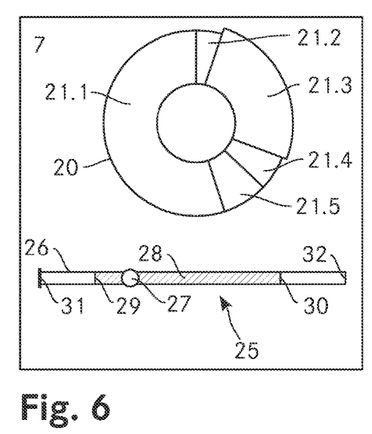
FIG. 6 a sixth visual presentation of a graphical main shape including node shapes and a graphical shifter shape on the display of a computer before a manipulation of the volume of a node.

FIG. 6 shows a sixth visual presentation of an annulus shaped graphical main shape 20 including five sector-shaped node shapes 21.1, 21.2, 21.3, 21.4, 21.5. This visual presentation shows the moment where the node shape 21.3 has been selected. Assumed that the screen 7 is the screen 7 of the mobile phone 15 shown in FIG. 3, the user has for example tapped on the area of the node shape 21.3 to select it and one of the processors of the mobile phone 15 has received a corresponding input signal from the touch screen 7 of the mobile phone 15 indicating the selection of node 21.3 by the user. In response to said receiving the same or another processor of the mobile phone 15 determines the possible range for the node shape 21.3 in which its volume may be modified and then the screen 7 is controlled to show US 2017/01 09028A1 a graphical shifter shape 25 which allows the user to modify the volume of the selected shape 21.3 within the possible range. In this case, the node shape 21.3 is also redefined in that it is slightly enlarged to give the user a feedback his selection of node shape 21.3. The graphical shifter shape 25 includes a bar like shape 26 of a particular length. The volume of the node shape 21.3 is expressed as a relative value in relation to the volume of the main shape 20. The total relative volume of the main shape 20 is therefore 1 or designated as 100%. The bar like shape 26 of the graphical shifter shape 25 in this example represents the whole volume of the main shape 20. Accordingly, the bar like shape 26 starts at the Zero spot 31 representing 0% and ends at the maximum spot 32 representing 100%. The possible range for the volume of the node shape 21.3 is also expressed in percentage quotation and is shown as the possible range 28 being a part of the bar like shape 26 starting at the minimum value 29 of the possible range and ending at the maximum value 30 of the range. In FIG. 6, the possible range 28 is shown as a hatched area of the bar like shape 26. Further, the graphical shifter shape 26 includes a handle shape 27 representing the current volume of the selected node shape 21.3. In FIG. 3-6 the minimum value 29 of the possible range 28 is 18% and the maximum value 30 of the possible range is 79%. The handle shape 27 denoting the current volume of the selected node shape 21.3 is arranged at 26%.

Figure 7:
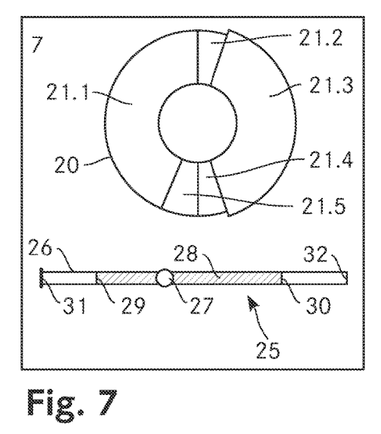
FIG. 7 a seventh visual presentation of a graphical main shape including node shapes and a graphical shifter shape on the display of a computer after a manipulation of the volume of a node.

FIG. 7 shows a seventh visual presentation of a graphical main shape 20 and node shapes 21.1, . . . 21.5. This presentation is similar to the one shown in FIG. 6. FIG. 7 however shows these shapes after a manipulation of the graphical shifter shape 25 by the user to represent a changed target volume for the selected node shape 21.3.

The user has for example moved the handle shape 27 on the screen 7 of the mobile phone 15 with his finger to the right, indicating a target volume of the node shape 21.3 being higher than its current volume. In FIG. 7 the user has moved the handle shape 27 from 26% to 39%.

As can be seen in FIG. 7, the size of the node shape 21.3 has been increased to represent its increased target volume. The sizes of the other node shapes 21.1, 21.2, 21.4, 21.5 has been decreased such that the volumes of all node shapes 21.1, . . . 21.5 again sum up to 1. In particular one of the processors of the mobile phone 15 has received an input signal from its screen 7 indicating the manipulation of the graphical shifter shape and in response to that receiving, the same or another processor of the mobile phone 15 has determined the target volumes of the node shapes 21.1, . . . 21.5 redefined them accordingly and controlled the pixels of the screen 7 to visually present the modified node shapes 21.1, . . . 21.5 on the screen 7 of mobile phone 15.

The user can move the handle within the possible range 28 of the graphical shifter shape 25 to indicate a desired target volume. In this example, the user has furthermore the possibility to indicate that the volume of the node shape 21.3 shall vanish. He can do this by moving the handle shape 27 to the zero spot 31. The user can however not move the handle shape 27 higher than the maximum value 30 of the possible range 28 or somewhere between the zero spot 31 and the minimal value 29 of the possible range 28.

Figure 8:
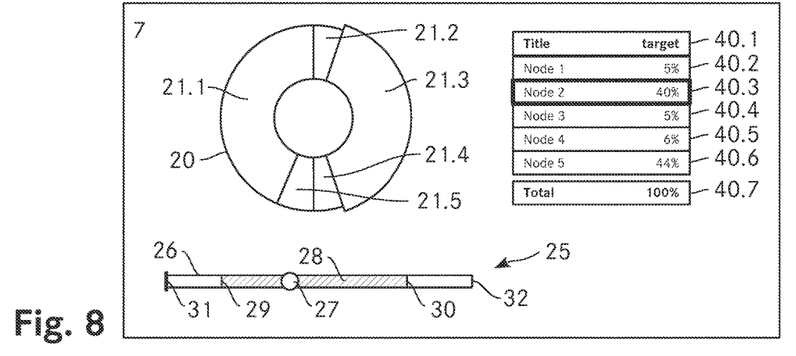
FIG. 8 an eighth visual presentation of a graphical main shape including node shapes, a graphical shifter shape and additional shapes on the display of a computer.

FIG. 8 shows an eighth visual presentation of the graphical main shape 20 and node shapes 21.1, . . . 21.5. This presentation corresponds partly to the one shown in FIG. 7. In addition to the graphical shapes shown in FIG. 7, FIG. 8 shows several info shapes 40.1, 40.2, 40.3, 40.4, 40.5, 40.6, 40.7. These info shapes 40.1, . . . 40.7 together form a kind of table giving further information of the node shapes 21.1, . . . 21.5 presented on the left side of the screen 7. The first info shape 40.1 includes a header line with the names of the columns shown in the shapes below. The last info shape 40.7 is a summary line and each of the info shapes 40.2, . . . 40.6 is assigned to one of the node shapes 21.1, . . . 21.5.

The first column denotes the title of the particular node shape and the second column denotes the target volumes of the node shapes 21.1, . . . 21.5 as shown in FIG. 7 as determined by said one or more processors.

It is to note that a node shape 21.1, . . . 21.5 can be selected by the user by selecting the desired node shape. It is however also possible for the user to select that node shape by selecting the corresponding info shape. The info shape corresponding to a selected node shape may then also be highlighted by for example shading that info shape or—as shown in FIG. 8, controlling the pixels of the screen to form a bold edge of that info shape.

Figure 9A:
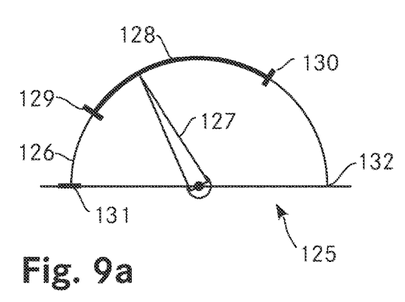
FIGS. 9a-9b a visual presentation of a graphical shifter shape on the display of a computer representing two different volumes.
Figure 9B:
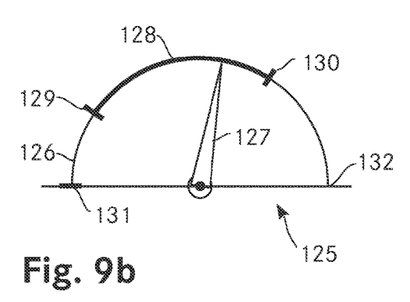

FIGS. 9a and 9b show a visual presentation of another example of a graphical shifter shape 125. The graphical shifter shape 125 includes a semicircle shape 126 representing the relative total volume 1 or 100% arranged on a base line where the zero spot 131 is on the left and the end spot 132 is on the right. The possible range 128 is indicated as a bold section of the semicircle shape 126 extending from the minimum value 129 to the maximum value 130. The handle shape 127 is visually presented in the form of a pointer fixed in the center of the base line. FIG. 9a shows the handle shape 127 indicating the current value of a selected node and FIG. 9b shows the handle shape 127 indicating the target value of said selected node.

Figure 10:
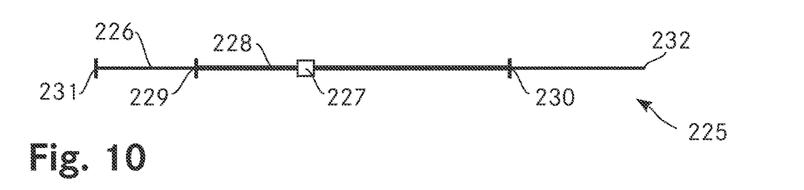
FIG. 10 another visual presentation of a graphical shifter shape on the display of a computer.

FIG. 10 shows a further visual presentation of a graphical shifter shape 225. The graphical shifter shape 225 includes a line shape 226 representing the relative total volume 1 or 100% limited on the left by the zero spot 231 and on the right by the end spot 232. The possible range 228 is indicated as a bold section of the line shape 226 extending from the minimum value 229 to the maximum value 230. The handle shape 227 is visually presented in the form of a small square shape that is movable on the line shape 226 to represent the current or a target volume.

The graphical shifter shape may be defined and visually presented on a display in many different shapes and sizes.

Figure 11:
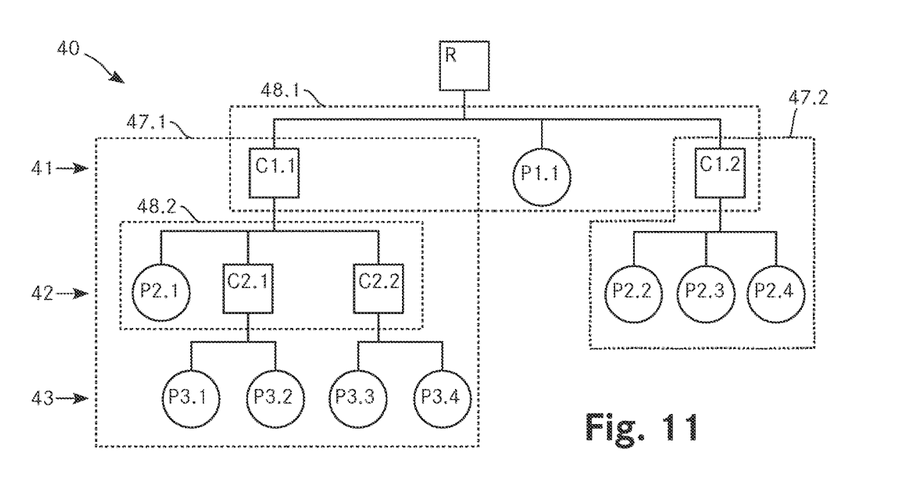
FIG. 11 a schematic depiction of a tree of nodes.

FIG. 11 shows a schematic depiction of a node tree 40. The node tree 40 is not presented on the display of a computer but represents the structure of a hierarchical distribution of a total volume onto a plurality of different products P1.1, P2.1, P2.2, P2.3, P2.4, P3.1, P3.2, P3.3 and P3.4. So each product is contained in exactly one container. The node tree 40 includes a root node R representing the total volume. Accordingly, the volumes of all products sum up to the total volume of the root node R.

In this example, the total volume corresponds to a certain amount of money to be invested in different investment products. Each particular investment product is represented by one of the products P1.1, P2.1, P2.2, P2.3, P2.4, P2.5, P3.1, P3.2, P3.3 and P3.4. These products are grouped and categorized in different categories and subcategories of investments which are represented by the containers C1.1, C1.2, C1.3, C2.1 and C2.2. The product P1.1 is "Cash" and is not categorized but is positioned on the first level 41 of the node tree 40 together with the category "Bonds" represented by container C1.1 and the category "Shares" represented by container C1.2. Container C1.1 includes the product P2.1 which for example is "inflation protected bonds" and two further containers C2.1 and C2.2 where container C2.1 represents the investment category "Region A" and container C2.2 represents the investment category "Region B". Container C2.1 includes two products P3.1 representing "Bonds country A" and P3.2 representing "Bonds country B". Container C2.2 also includes two products P3.3 representing "Bonds country C" and P3.4 representing "Bonds country D". Container C1.2 includes three products. Product P2.2 represents "Shares country A", product P2.3 represents "Shares country B" and product P2.4 represents "Shares country C".

The containers C1.1 and C1.2 and the product P1.1 build the first level 41 of the node tree 40, the containers C2.1 and C2.2 and the products P2.1, P2.2, P2.3, P2.4 build the second level 42 and the products P3.1, P3.2, P3.3 and P3.4 build the third level 41 of the node tree 40. The containers as well as the products are designated as nodes of the node tree 40 and the product nodes are designated as leaf nodes of the node tree 40.

The collection of direct child nodes of a particular node is designated as the branch of that particular node. The branch 48.1 for example includes all sub nodes of the root node R which are the product P1.1 and the containers C1.1 and C1.2. The branch 48.2 for example includes all sub nodes of container C1.1 which are the product P2.1 and the containers C2.1 and C2.2. Contrary to that, the subtree of a particular node includes all direct and indirect child nodes of that particular node. Subtree 47.1 for example denotes the subtree of the container C1.1 and subtree 47.2 for example denotes the subtree of the container C1.2.

Figure 12:
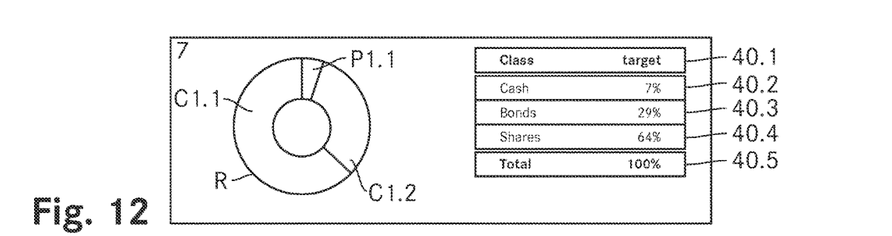
FIG. 12 an visual presentation on a screen representing a branch of the node tree shown in FIG. 11.

FIG. 12 shows a visual presentation on the screen 7 representing the branch 48.1 of the root node R shown in FIG. 11. It is to note that in this figure the main shape and the node shapes are labelled with the reference signs of the names of the nodes they represent instead of the names of the shapes. The node shapes shown in FIG. 12 represent the nodes of the branch 48.1 which are the product P1.1 and the containers C1.1 and C1.2. Presented on the screen 7 are further the info shapes 40.1, 40.2, 40.3, 40.4 and 40.5 where the info shape 40.1 shows the header line, the info shape 40.5 shows the summary line and the info shapes 40.2 to 40.4 represent the titles and the volumes of the nodes of the branch 48.1.

Figure 13:
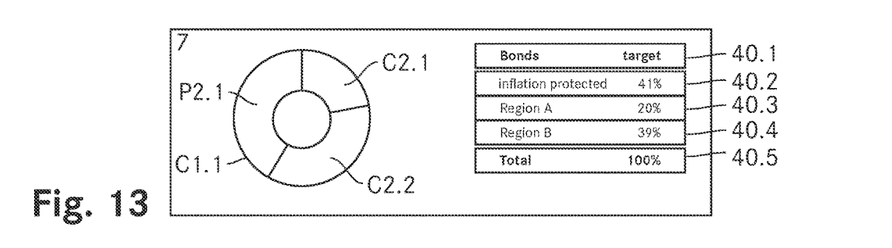
FIG. 13 an visual presentation on a screen representing a sub branch of the branch shown in FIG. 12 after being opened.

FIG. 13 shows a visual presentation on the screen 7 representing the branch 48.2 of the container C1.1 which has been opened by the user. Again, the main shape and the node shapes are labelled with the reference signs of the names of the nodes they represent instead of the names of the shapes. Further it is to note that the same main shape is used to represent the opened container C1.1 as in the presentation of the root node R in FIG. 12. The node shapes are however redefined to represent the nodes of the branch 48.2 instead of the nodes of the branch 48.1.

The node shapes of branch 48.2 represent the product P2.1 and the containers C2.1 and C2.2. Again, info shapes 40.1, 40.2, 40.3, 40.4 and 40.5 are presented on the screen 7 where the info shape 40.1 shows the header line, the info shape 40.5 shows the summary line and the info shapes 40.2 to 40.4 represent the titles and the volumes of the nodes of branch 48.2.

It is to note that the presentation on the screens 7 in FIGS. 12 and 13 may include further graphical shapes not shown such as for presenting further information about the current configuration of the portfolio managed by using the method according to the invention. The presentation may for example also include a graphical shape to show the risk of the portfolio and the corresponding risk variation. These graphical shapes may for example also be presented in a way similar to the graphical shifter shape shown in FIGS. 9a and 9b, namely similar to a speedometer indicating the risk and its variation by a rotating pointer.

As outlined above the processor or the processors not only do control the pixels of the screen to visually present the various graphical shapes on the screen but they also determine the possible range for a selected node based on the input signals received indicating the target volume of the selected node as well as the target volumes of the other nodes. These values are determined as outlined in the following paragraphs.

The method allows changing volumes at each branch of a sequence of branches subject to certain stability criteria. It is to note that the sequence of branches usually is determined by a user managing the tree of nodes, i.e. by opening a particular node to adapt the volume of one or more nodes of the branch of that particular node, then opening one of the nodes of that branch or closing that branch again and opening another node and so on. For a particular sequence of branches {SB1, SB2, SB3, . . . }, a range of feasible relative target volumes for each node of a sequence branch SB is determined in a first step where the range shall preferably be wide. Second, for each node within the sequence branch SB, a relative target volume within the range just indicated is determined. Thereby, target volumes given in a possible previous step of the sequence are replaced. Third, the volume of each node within the sequence branch SB is effectively changed towards these relative target volumes, subject to the stability criteria listed below. Thereby, the sequence of branches does not include any branches with zero total volume (i.e. where all nodes have a vanishing volume). On the onset of the sequence, however, initial relative target volumes are given for the nodes of each branch, including branches with initially zero total volume.

The stability criteria are:
Within a sequence branch SB, the relative volumes shall become close to the target volumes.
Outside the sequence branch SB, the relative volume of any node N shall stay close to the relative target volume set at the most previous sequence branch containing the respective node N, or, absent such previous sequence branch, close to the initial relative target volume.
The volume of any product (anywhere on the tree) that had a positive volume in the previous step of the sequence shall stay positive, unless it is a node with target volume set to zero, or a (direct or indirect) child node of such a node.
The initial tree configuration is assumed or chosen to consist with these stability criteria.

The method to determine the possible range for the nodes includes attaching a hidden variable to each node, denoted as a relative ideal volume. At the onset of the sequence, relative ideal volumes are set to the relative target volumes. After that, at each sequence step, relative ideal volumes of the nodes of the prevailing sequence branch are set to the then given relative target volumes. At any step of the sequence, the absolute volume of the products (and thus the entire state of the tree) are set as follows:

For each product, its absolute ideal volume is computed as the product of all relative ideal volumes along the path of nodes between the root node and the respective product node.

The absolute volume of each product is set to its absolute ideal volume, and, unless its unit size S is zero, floored to the next integer multiple of its unit size S.

Except for the absorber product, the products are ordered in descending order of the difference of their absolute ideal volume and the floored volume. The remaining total volume is used to add one unit size to each product (except to the absorber product), in the order just described—skipping thereby any product in the ordered list that has a unit size S exceeding either the then remaining total volume or the absolute ideal volume of the absorber product.

Any volume thus left unattributed is added to the absorber product.

This method then allows setting a consistent range of feasible relative target volumes for any given node N (keeping the ideal volume of all other nodes fixed) as follows For each product P that is part of the subtree of N, compute the ratio of its unit size to the product of the relative ideal volumes of all nodes on the path between the root node and the product P excluding the node N itself.

Define as the minimal relative ideal volume of a node N (given the state of the tree on all other nodes) the maximum over the ratios just obtained.

The minimal relative ideal volume thus obtained is set as the lower boundary for the feasible relative target volume for node N, i.e. the lower boundary for the possible range of target volumes for node N.

The upper boundary for the feasible relative target volume for node N is determined as 1 minus the sum of the lower boundaries for all other nodes of the branch containing node N.

In some situations only one node at each sequence branch may be selected as having a new target volume set explicitly, while zero or more other nodes of the sequence branch may be defined as blocked which means that their volume may not be changed. The remaining nodes having their target volume set implicitly by some rescaling function depending on the formerly selected node, so that the total relative target volumes sum up to 1. In such a situation, the maximal relative target volume of the explicitly set node can be given accordingly, i.e. by 1 minus the sum of the relative ideal volume of all blocked nodes minus the sum of the minimal relative ideal volume of the remaining nodes within the branch.

In case the total volume of the root node is not big enough, the method just described may result in small or even extremely small possible ranges within which the target volume of a node may be varied. This is because it would not be possible anymore to determine the target volumes for the other nodes of a branch if the target volume of the selected node would be set above the upper boundary. The range of feasible relative target volumes at each sequence branch may for example be enlarged by loosening the second and third stability criteria listed above by assigning relative fallback volumes to each node. The relative fallback volumes shall sum up to 1 for each branch. For practical purposes, the fallback volumes will typically be sparse such that only a minority of the nodes of a branch has a fallback volume above zero. The amended stability criteria are as follows:

Within a sequence branch SB, relative volumes shall become close to the target volumes.

Outside the sequence branch SB, the relative volume of the nodes of any branch B shall either be close to the relative target volume set at the most previous sequence branch that selected branch B, or, absent such previous sequence branch, close to the initial relative target volume, or be close to relative fallback volumes The volume of any product P (anywhere on the tree) that had a positive volume in the previous step of the sequence shall stay positive, unless it is either a node with target volume set to zero, or a (direct or indirect) child node of such a node, or all nodes of the branch containing product P have relative volumes close to their relative fallback volumes.

It is desired that the target volumes are replaced by fallback volumes only when necessary. The method then in addition includes the following fallback setting rules:

When relative target volumes are replaced by relative fallback volumes at a branch B, the relative target volumes are replaced by the relative fallback volumes at any sub-tree of any node of branch B.

If at any branch B, both the relative target volumes and the relative fallback volumes could be used without violating the third stability criteria listed above (i.e. one of the sub-criteria), then the relative target volumes are used.

Apart from thus conditionally using relative fallback volumes in lieu of relative ideal volumes, the method is the same as the one previously given. The minimal relative ideal volume of a given node is obtained by considering, at each branch B, the two route forkings (one using relative target volumes for the nodes of B, and the second using fallback volumes for the nodes of B) and taking the minimum of the minimal relative ideal volumes corresponding to all the routes that obey the fallback rules.

Although the invention has been described in terms of preferred embodiments, it will be understood and obvious for those skilled in the art that many alterations and variations may be made without departing from the invention. Accordingly, it is intended that all such alternation and variation be considered as within the spirit and scope of the invention.

The invention claimed is:

1. A method of controlling graphical elements of a display having a plurality of pixels with one or more processors, the method including defining by said one or more processors a graphical main shape on the display representing a total volume of a root node, defining by said one or more processors within the graphical main shape a number of graphical node shapes on the display, the number of node shapes being at least one and each node shape representing a volume of a parent node, wherein the volumes of all parent nodes sum up to the total volume, wherein at least one of the parent nodes includes at least one child node having a volume, wherein the volumes of all child nodes of the parent node sum up to the volume of the parent node and wherein at least one of the child nodes includes at least one grandchild node having a volume, wherein the volumes of all grandchild nodes of a child node sum up to the volume of said child node, controlling by said one or more processors the pixels of the graphical main shape to visually present the graphical main shape on the display, controlling by said one or more processors the pixels of the graphical node shapes to visually present the graphical node shapes on the display, receiving by said one or more processors an input signal from an input device indicating a selection of a parent node, and in response to said receiving determining by said one or more processors a possible range for the volume of the selected parent node by determining a minimum value and a maximum value of the range, defining by said one or more processors a graphical dialog shape on the display representing the possible range for the volume of the selected parent node, defining by said one or more processors a graphical shifter shape within the graphical dialog shape representing a current value of the volume of the selected parent node, controlling by said one or more processors the pixels of the graphical dialog shape to visually present the graphical dialog shape on the display and controlling by said one or more processors the pixels of the graphical shifter shape to visually present the graphical shifter shape on the display, receiving by said one or more processors a second input signal from an input device indicating manipulating of the graphical shifter shape with the input device, the manipulating defining a target volume of the selected parent node and in response to said manipulating determining by said one or more processors a target volume for each parent node, wherein the target volumes of all parent nodes sum up to the total volume, redefining by said one or more processors the graphical node shapes to represent the target volumes of the parent nodes and controlling by said one or more processors the pixels of the graphical node shapes to visually present the redefined graphical node shapes on the display, wherein an entirety of the root node, the parent nodes, the child nodes and the grandchild nodes are designated as nodes and wherein an entirety of the grandchild nodes, the child nodes having no grandchild nodes and the parent nodes having no child nodes are designated as products, wherein one of the products is designated as an absorber product having a unit size of zero and wherein the volume of all remaining products is an integer multiple of a product specific unit size, wherein the product specific unit size is a given volume greater than zero, wherein all direct sub nodes of a node are designated as a branch and wherein the volumes of the nodes of a branch are expressed as relative volumes in relation to the sum of the volumes of all nodes of that branch such that the sum of the relative volumes of all nodes of a branch equals 1, wherein the child nodes and the grandchild nodes of a node N are designated as a subtree of that node, wherein in response to said manipulating, a target volume for each node is determined by said one or more processors by assigning a relative ideal volume to each node,
determining an absolute ideal volume for each product by multiplying all relative ideal volumes of all nodes along a path between the root node and the respective product,
setting the absolute volume of each product to its absolute ideal volume, and
unless the unit size of the product is zero, flooring the absolute volume of the product to a next integer multiple of its unit size,
determining a remaining volume by subtracting the absolute volume of each product from the total volume,
except for the absorber product, ordering the products in descending order of a difference of their absolute ideal volume and the floored absolute volume,
distributing the remaining volume to the products by, in said order, adding one unit size to each product thereby skipping any product having a unit size exceeding either the then remaining volume or the absolute ideal volume of the absorber product, and
adding the remaining volume to the absorber product.

2. The method according to claim 1, wherein at least one of the parent nodes includes at least one child node having a volume, wherein the volumes of all child nodes of the parent node sum up to the volume of the parent node, the method further including receiving by said one or more processors a third input signal from an input device indicating an opening of a particular parent node, and
in response to said receiving
redefining by said one or more processors the graphical node shapes such that a number of the graphical node shapes corresponds to a number of the child nodes of the opened parent node, each graphical node shape representing a volume of a child node, and
controlling by said one or more processors the pixels of the graphical node shapes to visually present the redefined graphical node shapes on the display.

3. The method according to claim 2, further including defining the graphical main shape as a ring-like area of the display and defining each graphical node shape as a sector of the ring-like area.

4. The method according to claim 1, wherein indicating the selection of a parent node includes clicking the respective node shape.

5. The method according to claim 1, wherein the graphical dialog shape is defined by said one or more processors to include a bar-like shape and the graphical shifter shape is defined by said one or more processors to include a handle shape arranged on the bar-like shape to represent the current volume of the selected parent node.

6. The method according to claim 5, wherein manipulating of the graphical shifter shape includes arranging the handle shape at a position on the bar-like shape representing the target volume of the selected parent shape.

7. The method according to claim 1, wherein the step of defining by said one or more processors the graphical dialog shape includes defining a graphical null shape representing a possible zero value for the volume of the selected parent node.

8. The method according to claim 1, further including defining the graphical main shape as a ring-like area of the display and defining each graphical node shape as a sector of the ring-like area.

9. The method according to claim 1, wherein the total volume corresponds to an amount to be invested and the volume of a parent node corresponds to an amount to be invested into a particular investment product or to a sum of the amounts to be invested within a category of investment products.

10. The method according to claim 1, further including
determining by said one or more processors the possible range for the volume of the nodes of a branch B by determining the minimum value and the maximum value of the range of said nodes as relative values,
determining for each node of the branch B a minimal relative ideal volume as the minimum value of the range, by
determining for each product of the subtree of a node N a ratio of its unit size to a result of a multiplication of the relative ideal volumes of all nodes on a path between the root node and the product excluding the node N itself,
determining the minimal relative ideal volume of the node N as a maximum of said ratios, and
determining the maximal relative ideal volume as 1 minus the minimal relative ideal volumes of all remaining nodes of the branch B.

11. The method according to claim 1, further including
defining by said one or more processors a graphical lock shape on the display,
controlling by said one or more processors the pixels of the graphical lock shape to visually present the graphical lock shape on the display,
receiving by said one or more processors an fifth input signal from an input device indicating a locking of a selected node, and
in response to said receiving
redefining by said one or more processors the graphical node shape of the selected node to represent a locked selected node,
controlling by said one or more processors the pixels of the graphical node shape of the locked selected node to visually present the graphical node shape of the locked selected node on the display, and
omitting determining the target volume for each locked node but keeping the current volume of the locked node.

12. The method according to claim 1, further including
assigning a relative fallback volume to each node,
replacing the relative ideal volume by the relative fallback volume for a particular node and all nodes of the subtree of that node.

13. A system for performing the method of claim 1, the system including a display having a plurality of pixels, one or more processors for controlling graphical elements of the display and receiving input signals from one or more input devices.

* * * * *